US009128808B2

(12) United States Patent
Nakamura

(10) Patent No.: US 9,128,808 B2
(45) Date of Patent: Sep. 8, 2015

(54) COMPUTER READABLE STORAGE MEDIUM FOR REGISTRATION OF SITE INFORMATION AND A COMPUTER TO REGISTER SITE INFORMATION

(75) Inventor: Tomoki Nakamura, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 267 days.

(21) Appl. No.: 12/726,535

(22) Filed: Mar. 18, 2010

(65) Prior Publication Data

US 2010/0250711 A1   Sep. 30, 2010

(30) Foreign Application Priority Data

Mar. 28, 2009   (JP) ................... 2009-080696

(51) Int. Cl.
*G06F 15/16* (2006.01)
*G06F 13/00* (2006.01)

(52) U.S. Cl.
CPC ............... *G06F 13/00* (2013.01); *G06F 15/16* (2013.01)

(58) Field of Classification Search
USPC ......................................................... 709/219
See application file for complete search history.

(56) References Cited

U.S. PATENT DOCUMENTS

| 7,530,065 | B1 | 5/2009 | Ciudad et al. |
| 7,769,837 | B2 | 8/2010 | Nogawa et al. |
| 7,912,806 | B2 | 3/2011 | Yanagi et al. |
| 8,019,810 | B2 * | 9/2011 | Read ............................. 709/203 |
| 2004/0103190 | A1 | 5/2004 | Mochizuki et al. |
| 2005/0148326 | A1 | 7/2005 | Nogawa et al. |
| 2007/0078904 | A1 * | 4/2007 | Yoon et al. .................... 707/200 |
| 2007/0094346 | A1 | 4/2007 | Nussey |
| 2007/0174298 | A1 * | 7/2007 | Tanimoto ........................ 707/10 |
| 2007/0214477 | A1 * | 9/2007 | Read ............................... 725/38 |

(Continued)

FOREIGN PATENT DOCUMENTS

| JP | 2002-297342 A | 10/2002 |
| JP | 2003-152942 A | 5/2003 |

(Continued)

OTHER PUBLICATIONS

Japanese Official Action dated Jun. 29, 2010 with English translation.

(Continued)

*Primary Examiner* — Brian P Whipple
*Assistant Examiner* — James Edwards
(74) *Attorney, Agent, or Firm* — Scully, Scott, Murphy & Presser, PC

(57) ABSTRACT

A computer readable storage medium storing computer readable instructions is provided. The computer readable instructions control a computer to register site representing information with a communication device which is connectable to a network. The site representing information enables the communication device to obtain content summary information and includes information concerning an information providing site which delivers the content summary information. The content summary information includes location information to indicate a location of an information content provided through the network and a title of the information content. The computer readable instructions control the computer to execute steps of obtaining the site representing information registered with the computer, and registering the obtained site representing information with the communication device.

8 Claims, 9 Drawing Sheets

(56) References Cited

U.S. PATENT DOCUMENTS

| | | | |
|---|---|---|---|
| 2007/0255734 A1* | 11/2007 | Morimoto | 707/100 |
| 2008/0165209 A1 | 7/2008 | Kondo et al. | |
| 2008/0177707 A1* | 7/2008 | Morita et al. | 707/3 |
| 2008/0196022 A1 | 8/2008 | Diederichs | |
| 2009/0022476 A1* | 1/2009 | Nonoyama | 386/83 |
| 2009/0076904 A1* | 3/2009 | Serena | 705/14 |
| 2009/0182847 A1* | 7/2009 | Suzuki | 709/219 |
| 2009/0187638 A1* | 7/2009 | Park et al. | 709/217 |
| 2009/0195806 A1 | 8/2009 | Ohashi | |
| 2009/0298480 A1* | 12/2009 | Khambete et al. | 455/414.1 |
| 2010/0079796 A1 | 4/2010 | Matsushita | |
| 2010/0121831 A1 | 5/2010 | Lin et al. | |

FOREIGN PATENT DOCUMENTS

| | | |
|---|---|---|
| JP | 2004-005413 A | 1/2004 |
| JP | 2007-157096 A | 6/2007 |
| JP | 2007-200209 | 8/2007 |
| JP | 2007-219644 A | 8/2007 |
| JP | 2007-280248 A | 10/2007 |
| JP | 2008-078823 | 4/2008 |
| JP | 2008-165692 A | 7/2008 |
| JP | 2010-079831 | 4/2010 |

OTHER PUBLICATIONS

Official Action dated Feb. 2, 2012 in a related application, namely, U.S. Appl. No. 12/560,734.

Sih G.C. et al., "Dynamic-Level Scheduling for Heterogeneous Processor Networks", *IEEE* pp. 42-49 (1990).

Notice of Allowance dated Jul. 18, 2012 from related U.S. Appl. No. 12/560,734.

Official Action dated May 24, 2013 from related U.S. Appl. No. 12/731,765.

Feedreader.com user ppfr, "Check if site has added new RSS feeds", Feb. 13, 2008 (retrieved on Sep. 27, 2013). Retrieved from the Internet: http://www. feedreader.com/node/1421.

U.S. Office Action dated Oct. 16, 2013 from corresponding U.S. Appl. No. 12/731,765.

* cited by examiner

```
                                                    1210/2208
                                                        ↓

<?xml vewsion="1.0" encoding="UTF-8" ?>
                   - <rss version="0.2">
                   - <channel>
        3000 ————————<title>F's blog</title>
        3050 ————————<link>http://abcdefg.jp/diary/</link>
                        <description>F's updates</description>
                        <lastBuildDate>Tue, 17Feb 2009 15:30:05 +0900</astBuildDate>
                        <language>ja</language>
                        <copyright>Copyright (C) 2009 FFFF All rights reserved.</copyright>
       3200A ————————- <item>                                    3100A
       3300A ————————<title>It's cold today.</title>
       3400A ————————<link>http://abcdefg.jp/diary/20090217.html</link>
       3500A ————————<description>It's really cold today.•••</description>
       3600A ————————<pubDate>Tue, 17 Feb 2009 14:11:22 +0900</pubDate>
                        </item>
       3700A ————————- <item>                                    3100B
       3200B ————————<titel>It's hot today.</titel>
       3300B ————————<link>http://abcdefg.jp/diary/20090216.html</link>
       3400B ————————<description>It's really hot today.••• </description>
       3500B ————————<pubDate>Tue, 17 Feb 2009 13:00:29 +0900</pubDate>
       3600B ————————</item>
       3700B ————————- <item>                                    3100C
       3200C ————————<title>Nice weather.</title>
       3300C ————————<link>http://abcdefg.jp/diary/20090215.html</link>
       3400C ————————<description>It feels very nice today.•••</description>
       3500C ————————<pubDate>Tue, 17 Feb 2009 09:30:24 +0900</pubDate>
       3600C ————————</item>
       3700C ————————</channel>
                        </ree>
```

FIG. 2

COMPUTER READABLE STORAGE MEDIUM FOR REGISTRATION OF SITE INFORMATION AND A COMPUTER TO REGISTER SITE INFORMATION

CROSS REFERENCE TO RELATED APPLICATION

This application claims priority from Japanese Patent Application No. 2009-080696, filed on Mar. 28, 2009, the entire subject matter of which is incorporated herein by reference.

BACKGROUND

1. Technical Field

An aspect of the present invention relates to a computer readable storage medium for a computer capable of obtaining content summary information, which includes location information and a title of information contents provided through a network.

2. Related Art

Various kinds of information contents are provided openly to computer users, and the users can download the information contents through networks to view. In order to utilize such network environment, methods for effectively obtaining data through the networks are suggested. For example, techniques to display RSS (Resource Description Framework Site Summary)-formatted data in television receivers and personal computers (PCs) are provided. The RSS-formatted data is content summary information representing a source information content, which is published through a web site, and the summary information includes a title (header), hyperlinks, images, and articles of the source contents described in XML (eXtensible Markup Language).

SUMMARY

When the content summary information including the title and the hyperlinks is obtained by a communication device through the network, the communication device is required to be configured in predetermined settings.

The present invention is advantageous in that a computer readable storage medium to store computer readable instructions that control a computer, to register information concerning an information providing site which delivers the content summary information with the communication device, and the computer to execute the instructions to control the computer are provided.

According to an aspect of the present invention, a computer readable storage medium storing computer readable instructions is provided. The computer readable instructions control a computer to register site representing information with a communication device which is connectable to a network. The site representing information enables the communication device to obtain content summary information and includes information concerning an information providing site which delivers the content summary information. The content summary information includes location information to indicate a location of an information content provided through the network and a title of the information content. The computer readable instructions control the computer to execute steps of obtaining the site representing information registered with the computer, and registering the obtained site representing information with the communication device.

According to the above computer readable storage medium, the site representing information concerning the information providing site which delivers the content summary information can be registered with the communication device in a less complicated manner to the user.

According to another aspect of the present invention, a computer to register site representing information with a communication device which is connectable to a network is provided. The site representing information enables the communication device to obtain content summary information and includes information concerning an information providing site which delivers the content summary information. The content summary information includes location information to indicate a location of an information content provided through the network and a title of the information content. The computer includes an obtainer unit to obtain the site representing information registered with the computer, and a register unit to register the obtained site representing information with the communication device.

According to the above computer, the site representing information concerning the information providing site which delivers the content summary information can be registered with the communication device in a less complicated manner to the user.

BRIEF DESCRIPTION OF THE ACCOMPANYING DRAWINGS

FIG. 2 is illustrates RSS data to be used in the network system according to the embodiments of the present invention.

DETAILED DESCRIPTION

Hereinafter, embodiments according to the present invention will be described with reference to the accompanying drawings.

Figure 1:
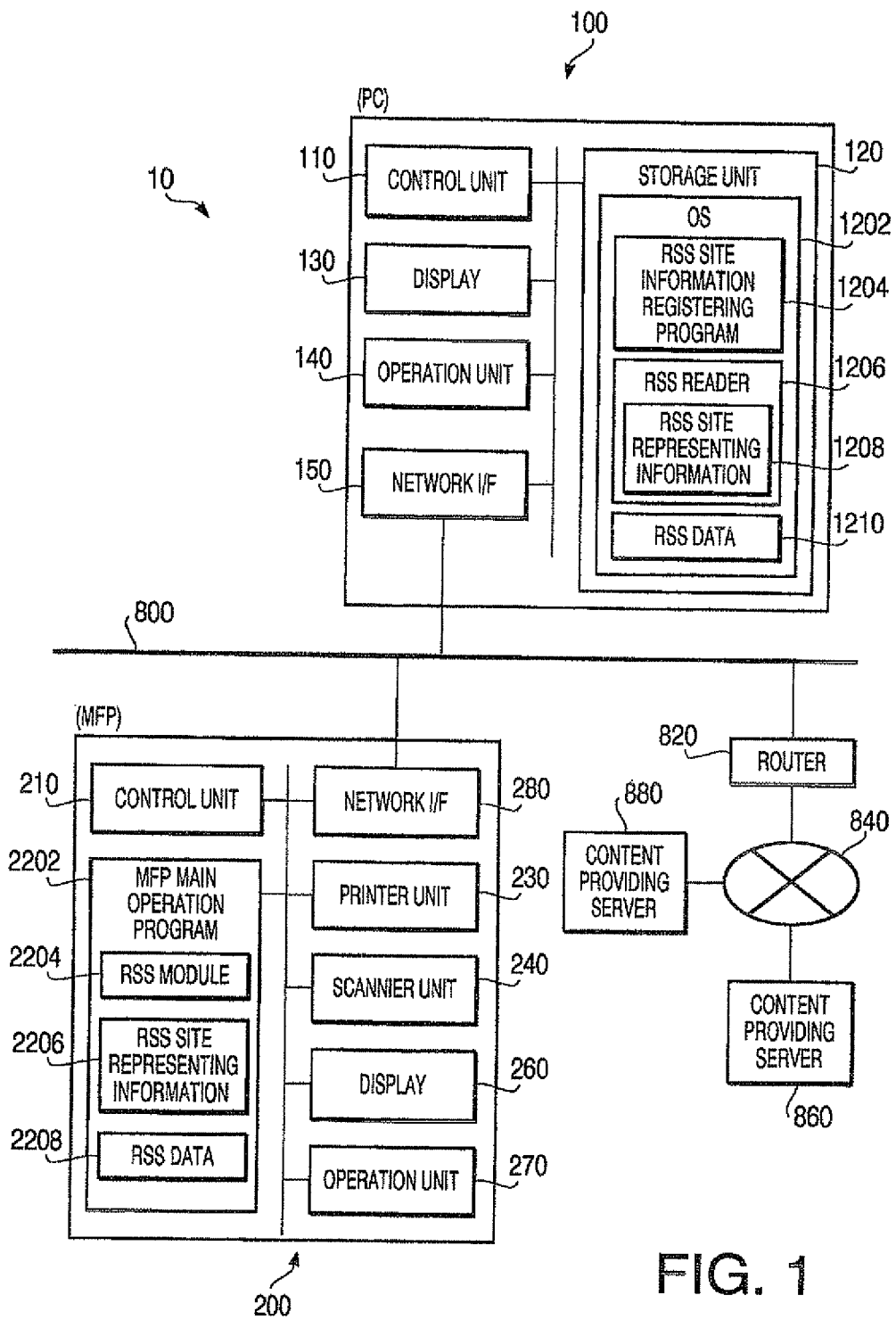
FIG. 1 is a block diagram to illustrate a network system according to embodiments of the present invention.

An overall configuration of a network system 10 according to the present embodiment will be described with reference to FIG. 1. The network system 10 includes a PC 100, a multifunctional peripheral (MFP) 200, and network devices (not shown), which are connected to one another through a local area network (LAN) 800 for data exchange. The MFP 200 is, for example, an image processing device to receive print data transmitted from the PC 100 and print an image according to the print data. Further, the MFP 200 can scan an image according to an instruction given by the PC 100 to generate image data and transmit the generated image data to the PC 100 through the LAN 800. The MFP 200 may further transmit data, which is not generated in the MFP 200 but is obtained through the Internet 840, to the PC 100.

The LAN 800 is connected to the Internet 840 through a router 820. The Internet 840 is a network to which servers, such as content providing servers 860, 880, are connected. The PC 100 and the MFP 200 are connected to the Internet 840 through the LAN 800 and the router 820.

The content providing server 860 provides a site 862, through which various information contents are published to public, and the content providing server 880 provides a site 882, through which various information contents are published to public. The content providing servers 860, 880 store feed information, which summarizes source information contents provided through the sites 862, 882, and deliver the feed information in the RSS format to RSS-enabled devices (e.g., the PC 100 and the MFP 200) which requested for the feed information.

In the present embodiment, the RSS-formatted information represents the content summary information, and the RSS-formatted information will be referred to as RSS data. Further, each of the content providing servers 860, 880 provides an RSS site, through which RSS data is distributed.

A configuration of the PC 100 will be described. The PC 100 includes a control unit 110, a storage unit 120, a display 130, an operation unit 140, and a network interface (I/F) 150. The operation unit 140 is an input unit, which includes a keyboard and a mouse. The network I/F 150 provides an interface through which the PC 100 is connected to the LAN 800.

The control unit 110 includes a CPU (not shown) to process arithmetic operations, a ROM to store various programs, and a RAM being a work area for the arithmetic operations. The storage unit 120 includes, for example, a hard disk drive (HDD). The storage unit 120 stores operating system (OS) 1202 and an RSS site representing information registering program 1206. The RSS site representing information registering program 1206, which will be described later in detail, is a program to register RSS site representing information with the MFP 200. The storage unit 120 further stores an RSS reader 1206, which is a program to obtain RSS data 1210 from the content providing servers 860, 880 on the Internet and displays information based on the RSS data in the display 130. Within the RSS reader 1206, information concerning the information providing site (i.e., the RSS sites) is registered. The information concerning the RSS sites will be referred to as RSS site representing information 1208. The RSS site representing information 1208 includes a title 3000 and URLs (Uniform Resource Locators) being location addresses of the RSS sites, from which the RSS data is obtained. Thus, for example, when URLs indicating locations of specific RSS sites are registered with the RSS reader 1206, the RSS data distributed from the registered RSS sites is delivered to the PC 100 automatically.

In the storage unit 120, further, RSS data 1210 obtained by the RSS reader 1206 is stored. The RSS reader 1206 manages the RSS data 1210 obtained from the RSS site and stored in the storage unit 120. Moreover, the storage unit 120 stores driver programs (not shown) to drive a printer unit 230 and a scanner unit 240 of the MFP 200.

The CPU in the control unit 110 accesses and activates the programs stored in the ROM and the programs 1202, 1204, 1206 stored in the storage unit 120 to develop in the RAM to process necessary operations. For example, when the RSS site representing information registering program 1204 stored in the storage unit 120 is activated, an RSS site representing information registering operation (see FIGS. 3 and 7) will be performed. For another example, when the RSS reader 1206 stored in the storage unit 120 is activated, the RSS data distributed through the RSS sites provided by the content providing servers 860, 880 is obtained. The obtained RSS data is registered with the RSS reader 1206 and also stored in the storage unit 120 to be the RSS data 1210.

The MFP 200 includes a control unit 210 with a CPU, a ROM, and a RAM (not shown), and a storage unit 220. Further, the MFP 200 includes a printer unit 230, a scanner unit 240, a display 260 to display information concerning operations in the MFP 200, an operation unit 270 being an input unit, through which a user's instruction can be entered, and a network I/F 280, which provides an interface to connect the MFP 200 to the LAN 800.

The control unit 210 a CPU (not shown) to process arithmetic operations, a ROM to store various programs, and a RAM being a work area for the arithmetic operations. The storage unit 120 includes, for example, a non-volatile memory (e.g., EEPROM) and/or a hard disk drive (HDD). The storage unit 120 stores, for example, an MFP main operation program 222 for an MFP main operation (see FIG. 8). Further, in the storage unit 220, RSS data 2208 is stored.

The MFP main operation program 2202 includes, for example, an RSS module 2204, which is used in order to achieve functionality equivalent to the RSS reader 1206 in the storage unit 120 of the PC 100. The RSS module 2204 registers various kinds of information, which includes updated frequency (Z) of an article posted in the RSS site. Further, the RSS module 2204 registers a viewed rate (K) for article texts 3500 (see FIG. 2) included in the obtained RSS data 2208 in association with the RSS site posting the article texts 3500. Furthermore, the RSS module 2204 registers a quantity (Sn) of the obtained article texts 3500 and a quantity of viewed article texts (Kn) in association with the RSS site. The information to be registered with the RSS module 2208 will be described later in detail.

The MFP main operation program 2202 registers RSS site representing information 2206, which includes a title 3000 and a URL of the RSS site). An amount of the RSS site representing information 2206 to be registered with the MFP main operation program 2202 is limited, for example, up to 10 pieces.

Figure 8:
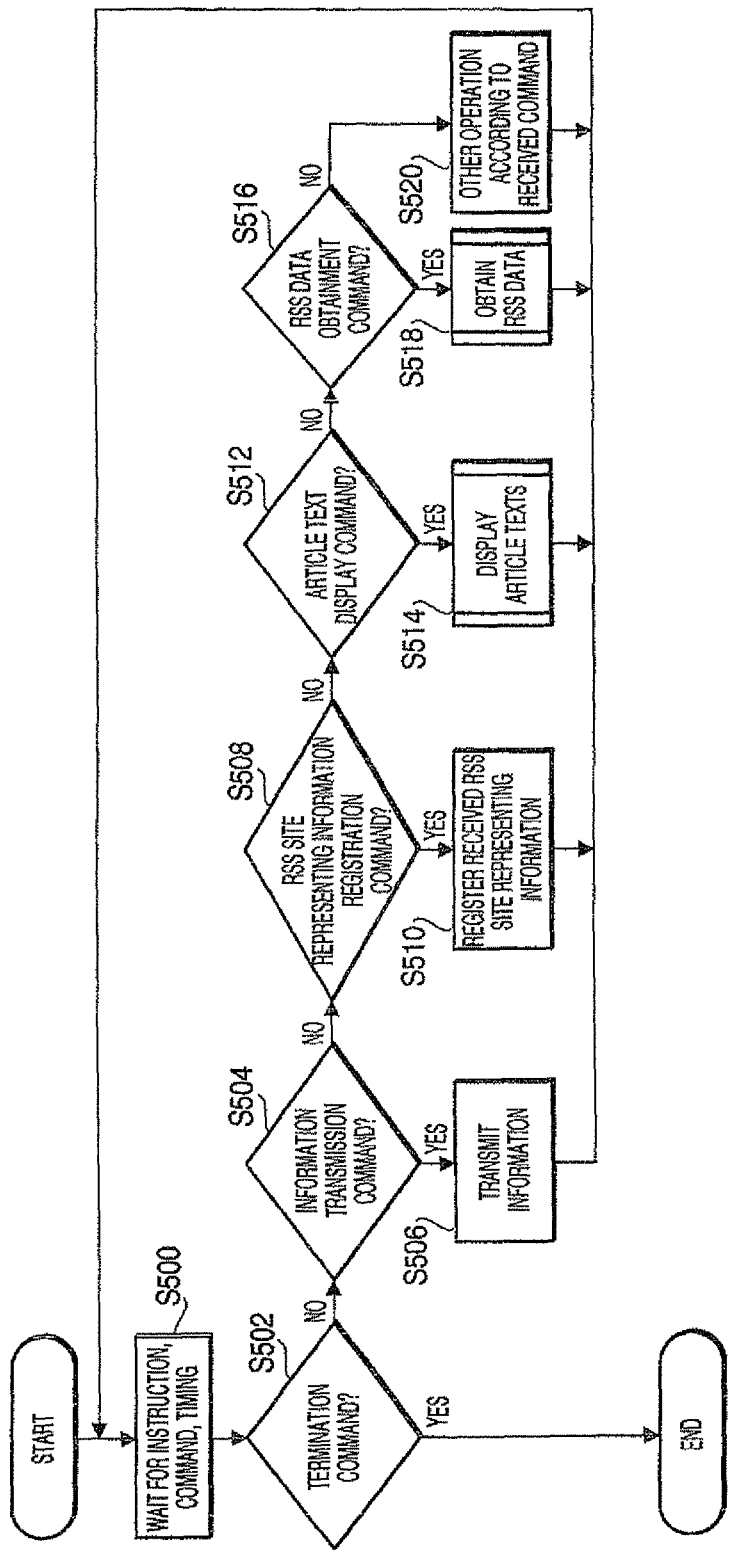
FIG. 8 is a flowchart to illustrate a main operation of an MFP (multi-function peripheral) according to the embodiments of the present invention.

The CPU in the control unit 210 accesses and activates the programs stored in the ROM and the MFP main operation program 2202 stored in the storage unit 220 to develop in the RAM to process necessary operations. For example, when a program for printing stored in the ROM is activated, print data received in the MFP 200 through the network I/F 280 is processed to form an image. For another example, according to the MFP main operation program 2202, of which flow is shown in FIG. 8, is executed. Further, for example, with reference to the RSS site representing information 2206 registered with the MFP main operation program 2202, the RSS data posted on the RSS sites, which are provided by the content providing servers 860, 880, is obtained. The obtained RSS data is registered with the RSS module 2204 in the MFP main operation program 2202 and stored in the storage unit 220 to be the RSS data 2208.

The RSS data 1210, 2208 to be obtained by the PC 100 and the MFP 200 will be described with reference to FIG. 2. The RSS data 1210, 2208 includes a main title 3000 (i.e., "F's blog") of the RSS site as being the provider of the RSS data, a URL 3050 (i.e., "http://abcdefg.jp/diary/") of the content providing servers 860, 880, and other information concerning contents 3100 (i.e., contents 3100A, 3100B, 3100C). The title 3000 of the RSS site is also used as a headline of the contents 3100A, 3100B, 3100C.

For example, the RSS data 1210, 2208 includes content 3100A (i.e., "20090217.html"), which is described in between <item> tags 3200A, 3700A. The information concerning the content 3100A includes a subhead 3300A (i.e., "It's cold today."), a URL 3400A (i.e., "http://abcdefg.jp/diary/20090217.html") indicating a location of the content 3100A, and an article text 3500A (i.e., "It's really cold today . . . "), and updated time 3600A (i.e., Feb. 17, 2009, 14 (hour):11 (minute):22 (second)). The other contents 3100B, 3100C in the RSS data 1210, 2208 are in the same data structure as the content 3100A.

Next, operations to be conducted by the control unit 110 of the PC will be described with reference to FIGS. 3-7. Further, operations to be conducted by the control unit 210 of the MFP 200 will be described with reference to FIGS. 8-11.

An RSS site representing information registering operation, in which information concerning the RSS sites is registered, will be described. The RSS site representing information registering operation starts when, for example, the user inputs an instruction to activate the RSS site representing information registering program 1204 through the operation unit 140, and the control unit 110 receives the instruction.

A first embodiment of the RSS site representing information registering operation will be described with reference to FIGS. 3-6. When the RSS site representing information registering operation starts, in S100, the control unit 100 of the PC 100 examines as to whether the storage unit 120 has the RSS reader 1206 installed. In particular, the control unit 110 accesses a database in the OS 1202, with which various kinds of operation settings concerning the PC 100 are registered, and confirms presence of the RSS reader 1206. The database is, for example, referred to as "registry" in Windows (registered trademark) OS manufactured by Microsoft Corporation.

In S102, the control unit 110 judges as to whether the RSS reader 1206 is installed in the storage unit 120. If the RSS reader 1206 is not installed (S102: NO), the flow is terminated. If the RSS reader 1206 is installed (S102: YES), in S104, the control unit 110 displays a window for a list 1320 of RSS readers 1206 installed in the storage unit 120 on the screen of the display 130 (see FIG. 4).

The list 1320 of RSS readers 1206 includes a reader name display area 1340, in which names of the installed RSS readers 1206 are presented, checkboxes 1360, which correspond to the names of the installed RSS readers 1206, an OK button 1380 and a cancel button 1390 being input interface for the user. In the list 1320 of RSS readers 1206 illustrated in FIG. 4, a checkmark is placed for a checkbox 1360 corresponding to an RSS reader named "RSS reader AAA" to select the RSS reader 1206. The control unit 110 waits for the user's input to select one of the RSS readers 1260.

Figure 3:
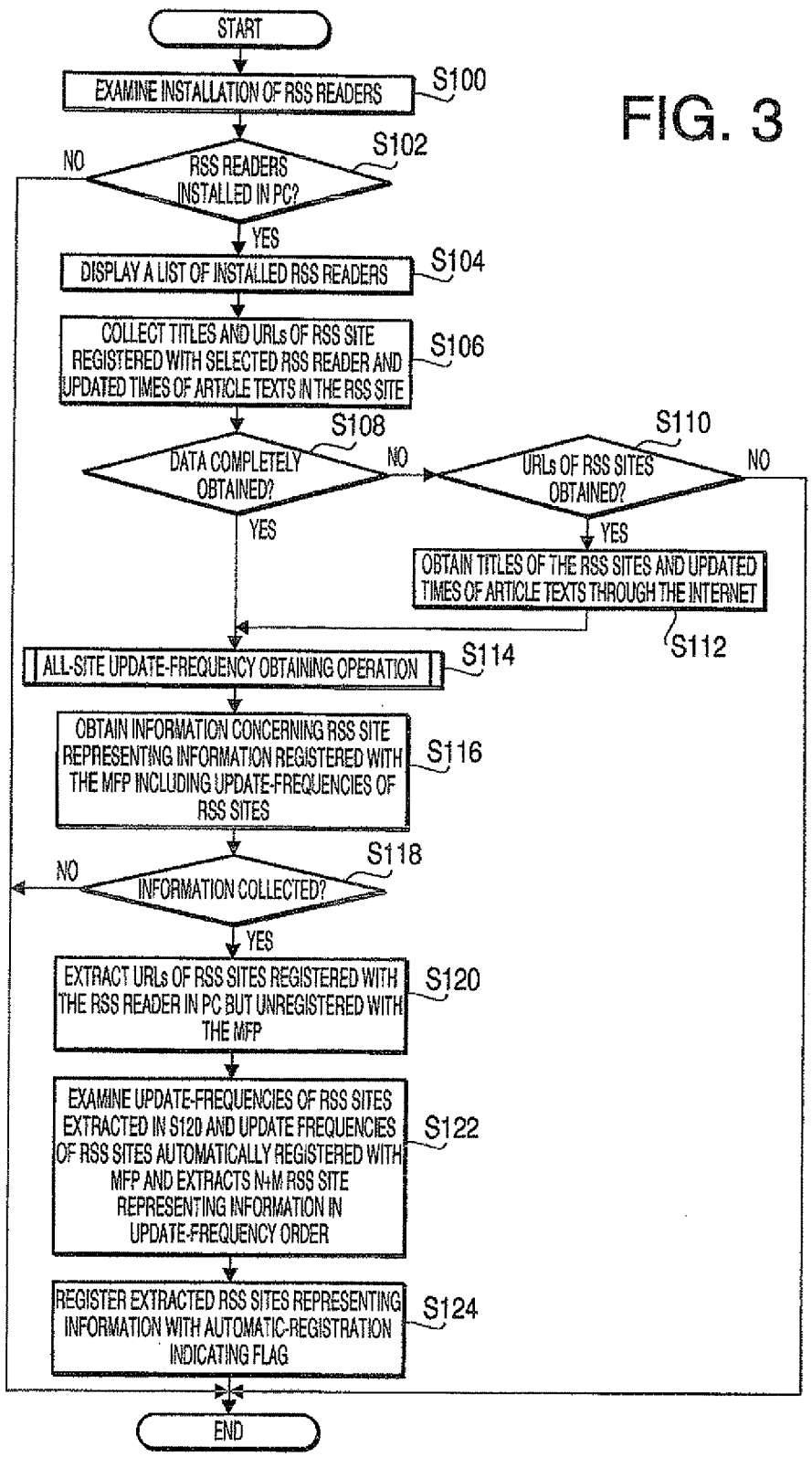
FIG. 3 is a flowchart to illustrate an RSS site representing information registering operation in the network system according to a first embodiment of the present invention.
Figure 4:
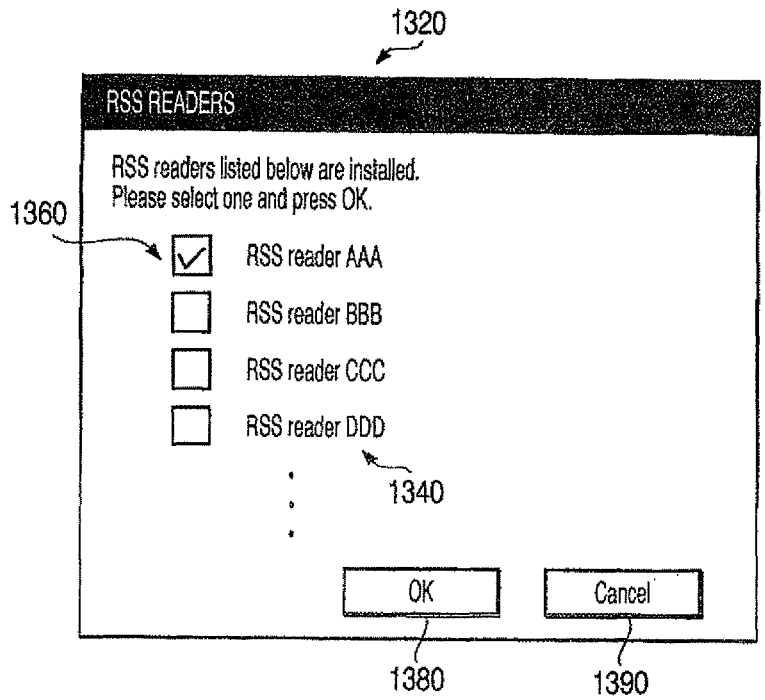
FIG. 4 illustrates a user interface window to present options of RSS readers according to the embodiments of the present invention.

When the user presses the cancel button 1390 through the operation unit 140, the control unit 110 terminates the operation, although the flow of cancellation is omitted and not shown in FIG. 3. When the user places a checkmark in one of the checkboxes 1340 indicating a desired RSS reader 1206 and presses the OK button 1380, the flow proceeds to S106.

In S106, the control unit 110 accesses the selected RSS reader 1206, which was designated by the checkmark in the checkbox 1340 after S104, and collects information including the RSS site representing information 1208 of all the RSS sites registered with the selected RSS reader 1206. In particular, the titles 3000 and the URLs of all the registered RSS sites are obtained. Further, the updated times 3600, including the updated times 3600A, 3600B, and 3600C, of the article texts 3500, including 3500A, 3500B, and 3500C, are extracted in association with the RSS site representing information 1208 and obtained from the RSS data 1210 stored in the storage unit 120.

In S108, the control unit 110 judges as to whether all the titles 3000 and the URLs of the registered RSS sites, and updated times 3600 of the article texts 3500 in the RSS data 1210 are collected. If the complete data is obtained (S108: YES), the flow proceeds to S114. If not all the data is obtained (S108: NO), the flow proceeds to S110. If URLs of a plurality of RSS sites were obtained in S106, the titles 3000 and the updated times 3600 for all the plurality of RSS sites are obtained. If not all the titles 3000 and the updated times 3600 for the plurality of RSS sites are obtained, negative judgment is made in S108.

In S110, the control unit 110 examines the data which failed to be obtained in S106 and judges as to whether specifically the URLs of the RSS sites registered with the selected RSS reader 1206 were obtained. When, for example, the URLs of the RSS sites were not obtained, regardless of obtainment of the titles 3000 or the updated times 3600 of the article texts 3500, negative judgment is made in S110 (S110: NO). When, for example, the URLs of the RSS sites were obtained, affirmative judgment is made in S110 (S110: YES).

If negative judgment is made in S110 (S110: NO), the control unit 110 terminates the operation. If affirmative judgment is made in S110 (S110: YES), the control unit 110 accesses the RSS sites provided by the content providing servers 860, 880 through the Internet according to the URLs having been obtained.

In S112, the control unit 100 accessing the RSS sites obtains the titles 3000 and/or the updated times 3600 of the article texts 3500, which failed to be obtained in S106, from the RSS sites. The flow proceeds to S114. With the step S112 in the flow, the titles 3000 and/or the updated times 3600, which failed to be obtained in S106, can be obtained. When the URLs of a plurality of RSS sites were obtained in S106, and not all the titles 3000 and the URLs of the registered RSS sites, and updated times 3600 of the article texts 3500 in the RSS data 1210 in S108, the control unit 110 accesses the RSS sites, of which the titles 3000 and the updated times 3600 failed to be obtained, respectively according to the URLs in S112.

In S114, the control unit 110 conducts an all-sites update-frequency obtaining operation, which will be described later in detail. The flow proceeds to S116. In S116, the control unit 110 controls the network I/F 150 to access the MFP 200 through the LAN 800 to obtain information concerning the RSS site representing information 2206 registered with the MFP 200. In particular, the control unit 110 transmits a request and inquires about an acceptable quantity (N) of pieces of RSS site representing information 2206 to be registered with the MFP 200. Further, the control unit 110 inquires about a quantity (M) of pieces of registered RSS site representing information 2206, which has been automatically registered with the MFP main operation program 2202 in the RSS site representing information registering operation conducted by the control unit 110 in the past, amongst the RSS site representing information 2206 registered with the MFP 200. Furthermore, the control unit 110 inquires about the URLs of the RSS sites represented in all the RSS sites representing information 2206 registered with the MFP 200. Further, the control unit 110 inquires about frequencies (Z) of the RSS data 2208 of the RSS sites, which correspond to the RSS site representing information 2206, to be updated. Further, the control unit 110 inquires about settings of flags of the RSS site representing information 2206, which are appended to the RSS site representing information 2206 having been registered automatically.

In S118, the control unit 110 judges as to whether the items inquired in S116 were collected. If not all the items were obtained (S118: NO), the control unit 110 terminates the operation. If all the items were obtained (S118: YES), in S120, the control unit 110 extracts URLs of the RSS sites, which are not stored in the storage unit 220 of the MFP 200 amongst the URLs of the RSS sites obtained from the selected RSS reader 1206, which was selected after S104. The flow proceeds to S122.

In S122, the control unit 110 examines the update-frequencies Z of the RSS sites corresponding to the URLs extracted in S120 and the update-frequencies Z of the RSS sites corresponding to the URLs included in the RSS site representing information 2206, to which automatic-registration indicating flags are appended. Thus, the update-frequency Z of each RSS site is examined, and the RSS sites with higher update-frequencies Z are determined to be extracted. Further, a quantity of RSS sites to be extracted is limited to N+M, in which N indicates the acceptable quantity of pieces of RSS site representing information 2206 to be registered with the MFP 200 and M indicates a quantity of pieces of registered RSS site representing information 2206, which has been automatically registered with the MFP 200.

In S124, the control unit 110 registers the extracted N+M pieces of RSS site representing information with the MFP 200. In this regard, the automatic-registration indicating flags are appended to the registered RSS site representing information 2206.

In particular, the control unit 110 controls the network I/F 150 to transmit a command to register the RSS site representing information with the MFP 200 and the RSS site representing information extracted in S122 to the MFP 200 through the LAN 800. Behaviors of the MFP 200 receiving the command and the RSS site representing information will be described later in detail with reference to FIG. 8. Following S124, the control unit 110 terminates the operation.

The all-sites update-frequency obtaining operation in S114 will be described with reference to FIG. 5. When the operation starts, in S200, the control unit 110 examines the RSS sites corresponding to the URLs which were obtained in S106 (see FIG. 3) and judges as to whether update-frequencies of all the RSS sites are calculated.

When update-frequencies of all the RSS sites are calculated (S200: YES), the flow is ended. When update-frequencies of all the RSS sites are not calculated (S200: NO), in S202, the control unit 110 extracts one of the RSS sites of which update-frequency is not calculated. In S204, the control unit 110 conducts an update-frequency obtaining operation, which will be described below, for the extracted RSS site.

Following S204, the flow returns to and repeats S200. The flow in S200-S204 is repeated until update-frequencies of all the RSS sites corresponding to the URLs which were obtained in S106 are obtained.

Figure 6:
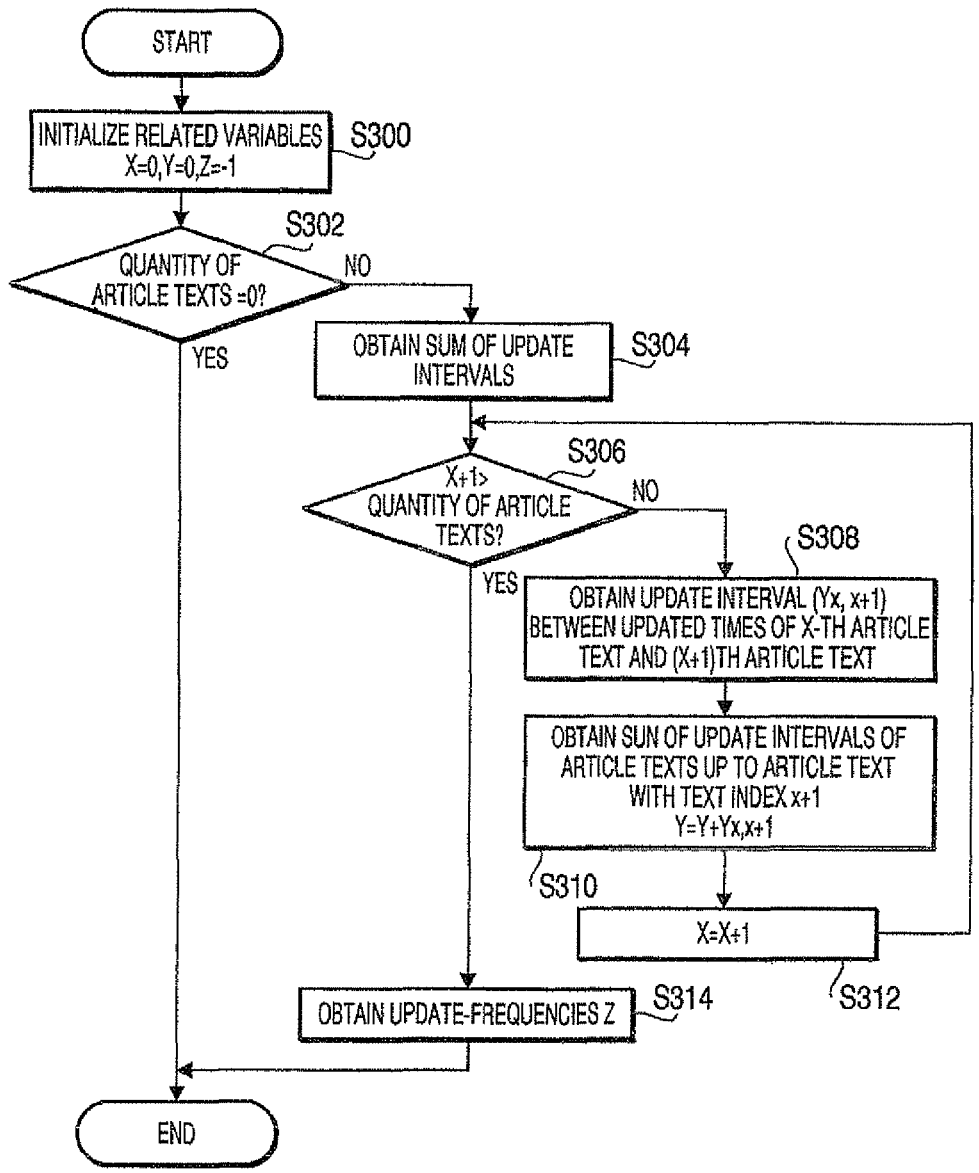
FIG. 6 is a flowchart to illustrate an update-frequency obtaining operation according to the embodiments of the present invention.

The update-frequency obtaining operation in S204 will be described with reference to FIG. 6. When the operation starts, in S300, the control unit 110 initializes related variables to be used in the operation. The variables include an article index (X), a sum of updated times (Y), and an update-frequency (Z). In S300, the control unit 110 sets the article index X to 0 (zero), and the sum of updated times Y to 0 (zero), and the update frequency Z to −1 (minus one).

The article index X is an index, to which the article text 3500 is appended. In particular, the article texts 3500 updated at the timings indicated in the updated times 3600, which were obtained in S106 (see FIG. 3) or in S112 (see FIG. 3), in association with the RSS site selected in S202 (see FIG. 5).

Figure 5:
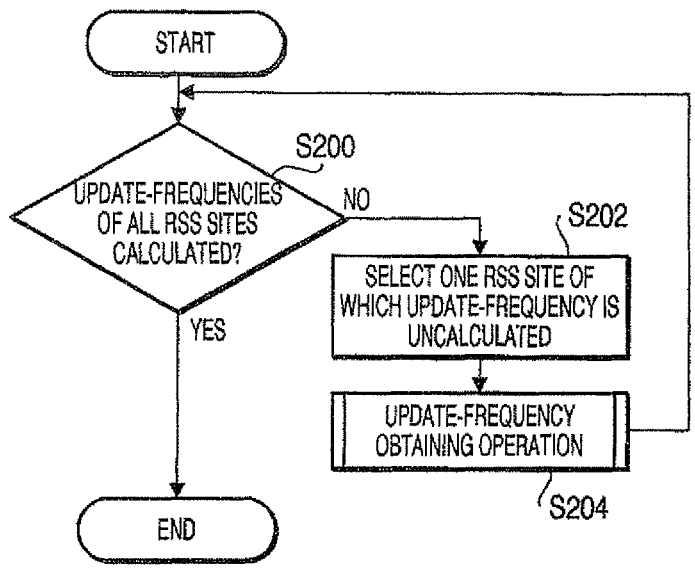
FIG. 5 is a flowchart to illustrate an all-sites update-frequency obtaining operation according to the embodiments of the present invention.

The article index X being 0 is appended to the article text 3500A, which was updated at the timing indicated in the latest updated time 3600A amongst the updated times 3600 of the latest RSS data 1210 obtained from the selected RSS site selected in S202 (see FIG. 5). A article index X being 1 is appended to an article text 3500 with its updated time 3600 being next latest, and the article index X increases as the updated time 3600 of an article text 3500 becomes older.

In S302, the control unit 110 counts a total quantity (N) of the article texts 3500, which were updated at the timings indicated in the update times 3600 obtained in S106 or S112, and examines as to whether the total quantity (N) is 0 (zero). In this regard, the total quantity of article texts 3500 is equal to a quantity of the updated times 3600 obtained in S106 or in S112. Thus, the control unit 110 sets the quantity of the updated times 3600 to be the quantity N of the article texts 3500.

In S302, when the total quantity of article texts 3500 is 0 (S302: YES), the control unit terminates the operation. Thus, the variable Z indicating the update-frequency being −1 remains set. When the total quantity of article texts 3500 is not 0 (S302: NO), in S304, the control unit 110 obtains current time from a clock (not shown) of the PC 100. Further, the control unit 110 compares the latest updated time 3600A included in the latest RSS data 1210, which was obtained from the RSS site selected in S202 (FIG. 5) in the all-site update-frequency obtaining operation, with the current time in order to calculate update interval of the article text 3500A. The obtained update interval is set to be default sum (Y) of update intervals.

In S306, the control unit 110 compares the article index X incremented by 1 (i.e., X+1) and the quantity N of the article texts 3500 to judge as to whether X+1 is greater than the quantity N of the article texts 3500. In an initial flow of the update-frequency obtaining operation, the article index X indicates 0 as being set in S300; therefore, X+1 indicates 1.

When X+1 is greater than the quantity N of the article texts (S306: YES), the flow proceeds to S314. When X+1 is smaller than or equal to the quantity N of the article texts 3500 (S306: NO), the flow proceeds to S308.

In S308, update interval (Yx, x+1) between the article text 3500 (Yx), to which the current article index X is appended (X being 0 in the initial flow), and the article text 3500 (x+1), to which the article index X+1 is appended, is obtained. In the example of the RSS data 1210 shown in FIG. 2, update interval (Yx, x+1) between the updated time 3600A of the article text 3500A with the article index X and the updated time 3600B of the article text 3500B with the article index X+1 are obtained. In this example, the update interval (Yx, x+1) being 1 (hour):10 (minute):53 (second) is obtained.

In S310, the control unit 110 adds the update interval (Yx, x+1) obtained in S308 to the sum (Y) of the update intervals. For example, in the initial flow, the update interval (Yx, x+1) between the article text 3500A with the article index X (i.e., 0)

and the article text 3500B with the article index X+1 (i.e., 1) obtained in S308 is added to the default sum (Y) of update intervals so that new sum (Y) is obtained. In a flow later than the initial flow, the update interval (Yx, x+1) obtained in S308 conducted immediately before in the current flow is added to the sum (Y) obtained in S310 conducted in the preceding flow to obtain the latest sum (Y). In S312, the control unit 110 increments the article index X by 1 to obtain a latest article index X. The flow returns to S306.

Thus, the flow in S306-S312 is repeated until affirmative judgment is made in S306. When, therefore, the article index X appended to the article text 3500 (i.e., the article text 3500C in the example shown in FIG. 2) with the oldest updated time 3600 (i.e., 3600C) included in the latest RSS data 1210, which was obtained from the RSS site selected in S202 in the all-site update-frequency obtaining operation, is incremented to a quantity equivalent to the quantity N of the article texts 3500 in S312, affirmative judgment is made in S306 (S306: YES) in the succeeding flow. The flow proceeds to S314.

In S314, the quantity N of the article text 3500 obtained in S302 is divided by the sum Y of the update intervals in order to obtain the update frequency Z. The obtained update frequency Z will thereafter serve as update frequency Z of the RSS site selected in S202 in the all-site update-frequency obtaining operation. The control unit 110 terminates the operation and returns to S200 (see FIG. 5) and in S114 (see FIG. 3).

Next, a second embodiment of the RSS site representing information registering operation will be described with reference to FIG. 7. In the following description, behaviors of the control unit 110 identical to those in the first embodiment will be referred to with identical reference step numbers, and explanation of those will be omitted. When the RSS site representing information registering operation starts, the control unit 110 conducts S100 and S102. In this regard, the control unit 110 examines installation of the RSS reader 1206, with which predetermined information to be obtained in S406 is registered. The information to be obtained in S406 will be described later.

When the RSS reader 1206 is installed (S102: YES), the flow proceeds to S104 and to S406. In S406, the control unit 110 accesses the selected RSS reader 1206 and collects information including the RSS site representing information 1208 of all the RSS sites registered with the selected RSS reader 1206. In particular, the titles 3000 and the URLs of the RSS sites registered with the selected RSS reader 1206. Further, a quantity of obtained article texts, that is, a number of article texts 3500, which are included in all RSS data 1210 registered with the RSS reader 1206 and stored in the storage unit 120, is obtained in association with the RSS site representing information of the RSS sites.

Further, in S406, the control unit 110 examines the RSS data 1210 registered with the RSS reader 1206 and stored in the storage unit 120, and obtains a quantity of viewed article texts. The quantity of viewed article texts is a number of article texts 3500 corresponding to the URLs 3400 (e.g., URLs 3400A, 3400B, 3400C), through which the contents 3100 (e.g., contents 3100A, 3100B, 3100C) have been accessed by the control unit 110.

In S408, the control unit 110 judges as to whether all the titles 3000 and the URLs of the registered RSS sites, the quantity of obtained article texts, and the quantity of viewed article texts are collected. If the complete data is obtained (S408: YES), the flow proceeds to S410. If not all the data is obtained (S408: NO), the control unit 110 terminates the flow.

In S410, the control unit 110 divides the quantity of viewed texts by the quantity of obtained texts to obtain a viewed rate for each RSS site. In S412, the control unit 110 requests the MFP 200 for and obtains an acceptable quantity (N) of pieces of RSS site representing information 2206 to be registered with the MFP 200, a quantity (M) of automatically registered RSS site representing information 2206, the URLs of the RSS sites represented in all the RSS sites representing information 2206 registered with the MFP 200, and the settings of automatic-registration indicating flags of the RSS site representing information 2206. Further, the control unit 110 requests the MFP 200 for and obtains a viewed rate (K) concerning the RSS data 2202 for each RSS site corresponding to the RSS site representing information 2206. Following S412, the control unit 110 conducts S118, and S120. In S118 in the second embodiment, the judgment is made concerning the information obtained in S412.

In S418, the control unit 110 examines the viewed rates of the RSS sites corresponding to the URLs extracted in S120 and the viewed rates (K) of the RSS sites corresponding to the URLs included in the URLs included in the RSS site representing information, to which the automatic-registration indicating flags are appended. Thus, the RSS sites with higher viewed rates are extracted. In this regard, a quantity of RSS sites to be extracted is limited to N+M. Following S418, the control unit 110 conducts S124 and terminates the flow thereafter.

Next, an MFP main operation to be conducted in the MFP 200 will be described with reference to FIG. 8. The MFP main operation starts when, for example, the user instructs to activate the operation through the operation unit 270 or when the MFP 200 is powered on. When the operation starts, in S500, the control unit 210 of the MFP 200 waits until the user's predetermined command is entered through the operation unit 270 or from the PC 100 through the LAN 800 and the network I/F 280. When the command is received, in the flow in S502-S516, the control unit 210 determines a type of the command. In particular, in S502, if the command is a termination command to terminate the operation (S502: YES), the control unit 210 terminates the MFP main operation.

If the command is not a termination command (S502: NO), in S504, the control unit 210 judges as to whether the command is an information transmission command, which was transmitted in the RSS site representing information registering operation (see FIGS. 3 and 7) conducted in the PC 100 and received through the network I/F 280. If the command is not an information transmission command (S504: NO), the flow proceeds to S508. If the command is an information transmission command (S504: YES), in S506, the control unit 210 transmits the requested information from, for example, the storage unit 220 and the RSS module 2204. Further, the control unit 210 transmits the obtained information to the PC 100, which is the requester, through the network I/F 280.

In S508, the control unit 210 judges as to whether the command is an RSS site representing information registering command. If the command is not an RSS site representing information registering command (S508: NO), the flow proceeds to S512. If the command is an RSS site representing information registering command (S508: YES), the flow proceeds to S510. In S510, the control unit 210 registers RSS site representing information received along with the received command with the activated MFP main operation program 220 as the RSS site representing information 2206. In this regard, the control unit 210 appends the automatic-registration indicating flags, which indicate the RSS site representing information 2206 being registered is automatically registered according to the RSS site representing information registering operation (see FIGS. 3 and 7), to the RSS site representing information 2206.

In S512, the control unit 210 judges as to whether the command is an article text display command entered through the operation unit 270. If the command is not an article text display command entered through the operation unit 270 (S512: NO), the flow proceeds to S516. If the command is an article text display command entered through the operation unit 270 (S512: YES), in S514, the control unit 210 conducts an article text displaying operation, which will be described later.

In S516, the control unit 210 judges as to whether the command is an RSS data obtainment command entered through the operation unit 270. If the command is not an RSS data obtainment command entered through the operation unit 270 (S516: NO), the flow proceeds to S520. If the command is an RSS data obtainment command entered through the operation unit 270 (S516: YES), in S518, the control unit 210 conducts an RSS data obtaining operation, which will be described later. In S520, the control unit 210 conducts an operation according to the received command. The flow following any of S506, S510, S514, S518, and S520 returns to S500.

Figure 9:
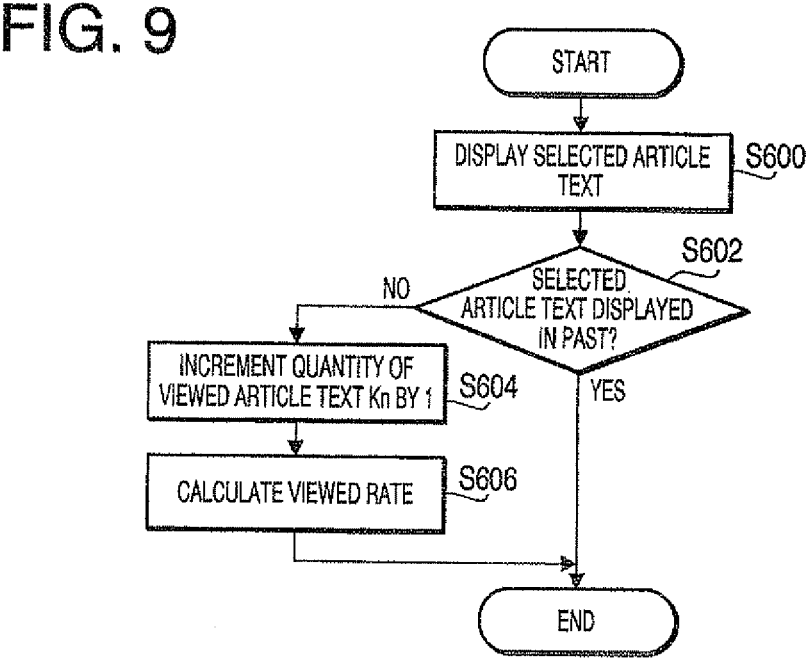
FIG. 9 is a flowchart to illustrate an article displaying operation according to the embodiments of the present invention.

The article text displaying operation to be conducted in S514 in the MFP main operation will be described with reference to FIG. 9. The article text displaying operation starts when the user's instruction to activate the function of the RSS reader is entered. According to this operation, the control unit 210 presents a list of RSS data 2208 which is registered with the RSS module 2204 and stored in the storage unit 220 to the user through a screen of the display 260. When the user selects one of the RSS data 2208 in the list and, and the selection is entered, in S600, the control unit 210 presents information including the title 3000 of the RSS site, the titles 3300 (e.g., the titles 3300A, 3300B, and 3300C) of the article texts 3500, the article texts 3500, which are included in the selected RSS data 2208, to the user through the screen of the display 260.

When the user selects one of the article texts 3500, the control unit 210 obtains the article text display command entered in S512. Further, the control unit 210 controls the network I/F 280 and, according to the URL 3400 of the selected article text 3500, accesses the RSS site provided by one of the content providing servers 860, 880 to obtain the contents 3100 corresponding to the selected article text 3500 to be displayed. For example, when the user selects the article text 3500A, the control unit 210 manipulates the network I/F 280 according to the URL 3400A (i.e., http://abcdefg.jp/diary/20090217.html) corresponding to the selected article text 3500 and obtains the content 3100A (i.e., 20090217.html). The obtained content 3100A is displayed on the screen of the display 260. Further, in S600, the control unit 210 registers the displayed content 3100A, or information to identify the content 3100A, with the RSS module 2204.

In S602, the control unit 210 examines the registered data in the RSS module 2204 and judges as to whether the selected article text 3500 has ever been selected and the currently displayed content 3100 has been displayed in the past. If the currently displayed content 3100 has been displayed in the past (S602: YES), the control unit 210 terminates the flow and returns to S500 (see FIG. 8). If the currently displayed content 3100 has never been displayed (S602: NO), the flow proceeds to S604.

In S604, the control unit 210 increments the quantity (Kn) of viewed article texts registered with the RSS module 2204 by 1, and the incremented value is registered to be a new quantity (Kn) of viewed article texts. In S606, the controller unit 210 refers to the quantity (Sn) of the obtained article texts 3500 and divides the quantity of the newly registered quantity (Kn) of viewed article texts by the quantity (Sn) of the obtained article texts 3500. Thus, a new viewed rate (K) is obtained. The control unit 210 registers the new viewed rate (K) with the RSS module 2204. The flow in the article text displaying operation ends and returns to S500 (see FIG. 8).

Figure 7:
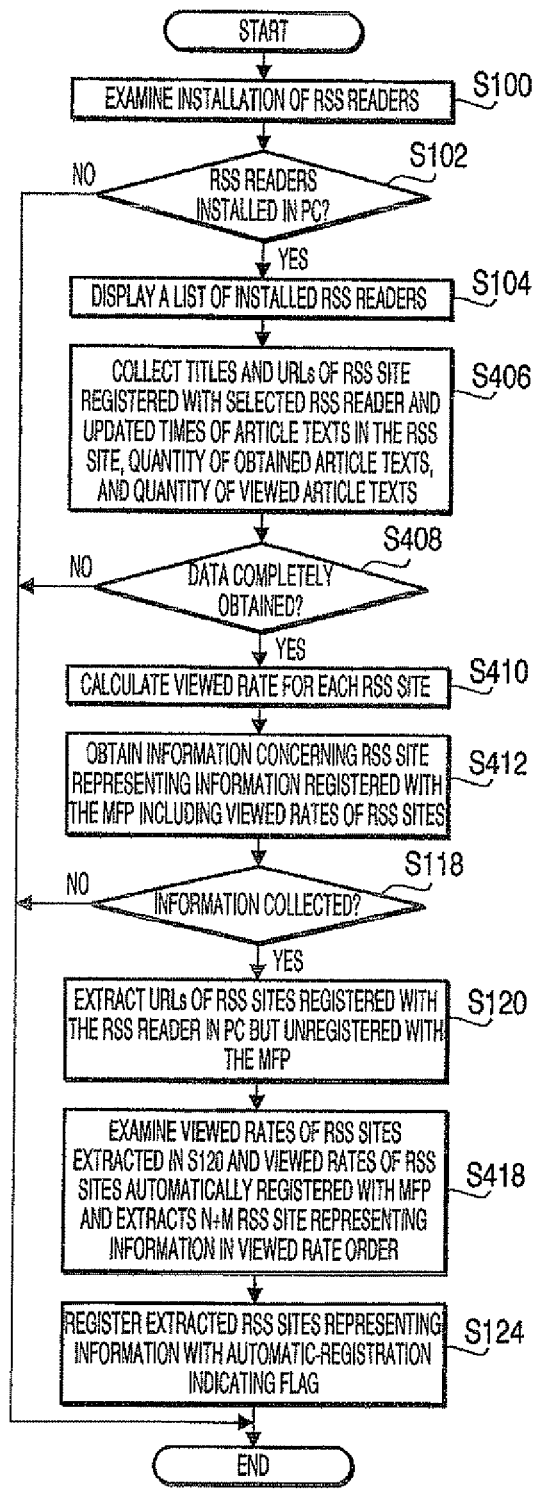
FIG. 7 is a flowchart to illustrate an RSS site representing information registering operation in the network system according to a second embodiment of the present invention.

The viewed rate (K) registered with the RSS module 2204 in the above flow is transmitted from the MFP 200 to the PC 100 in S504 (see FIG. 504) in response to the request from the PC 100 in S412 (see FIG. 7).

Figure 10:
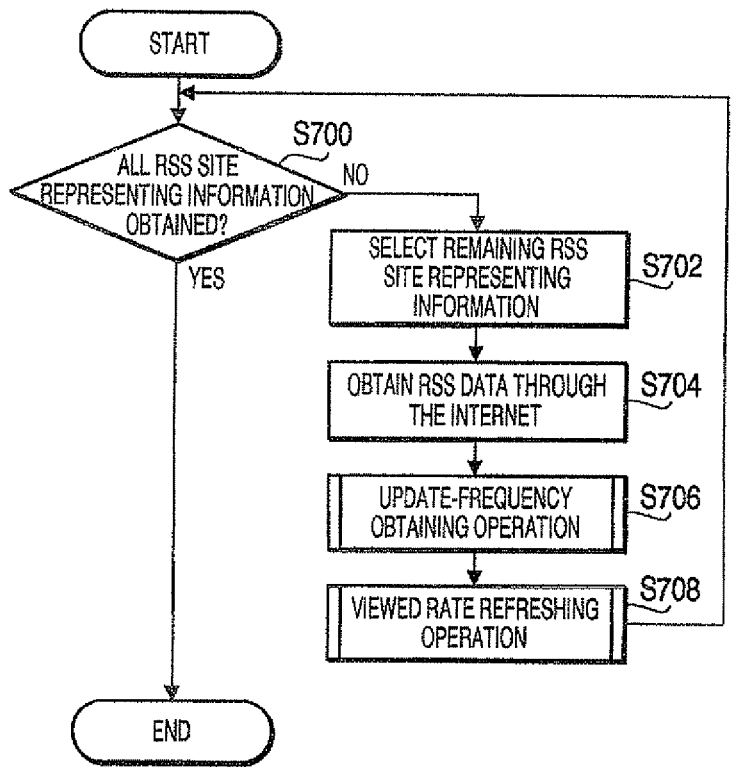
FIG. 10 is a flowchart to illustrate an RSS data obtaining operation according to the embodiments of the present invention.

Next, the RSS data obtaining operation to be conducted by the MFP 200 in S518 in the MFP main operation will be described with reference to FIG. 10. When the operation starts, in S700, the control unit 210 examines the RSS site representing information 2206 registered with the MFP main operation program 2202 and judges as to whether all the RSS data corresponding to the RSS site representing information 2206 has been obtained from each RSS site. If all the RSS data has been obtained (S700: YES), the control unit 210 terminates the flow and returns to S500 (see FIG. 8). If the RSS data to be obtained remains incomplete (S700: NO), the flow proceeds to S702.

In S702, the control unit 210 designates a piece of RSS site representing information 2206 corresponding to the RSS data, of which obtainment remains incomplete. In S704, the control unit 210 controls the network I/F 280 to access the RSS site provided by one of the content providing servers 860, 880 on the Internet 840 according to the URL indicated in the RSS site representing information 2206 designated in S702. Thus, the control unit 210 obtains the RSS data. The control unit 210 registers the obtained RSS data with the RSS module 2204. Further, the obtained RSS data is stored in the storage unit 220 to be the RSS data 2208.

Following S704, in S706, the control unit 210 conducts the update-frequency obtaining operation, which is described above and illustrated in FIG. 6. In S706, the RSS data 2208 stored in the storage unit 220 is subject to being processed in the update-frequency obtaining operation. The update-frequency (Z) obtained in the update-frequency obtaining operation is registered with the RSS module 2204. Further, the update-frequency (Z) obtained in the update-frequency obtaining operation is transmitted from the MFP 200 to the PC 100 in response to the request from the PC 100 in S116 in the RSS site representing information registering operation (see FIG. 3).

In S708, the control unit 210 conducts a viewed rate refreshing operation, which will be described below in detail. Following S708, the flow returns to S700. Thus, the flow S700-S708 is repeated until all the RSS data is obtained from each RSS site and affirmative judgment is made in S700.

Figure 11:
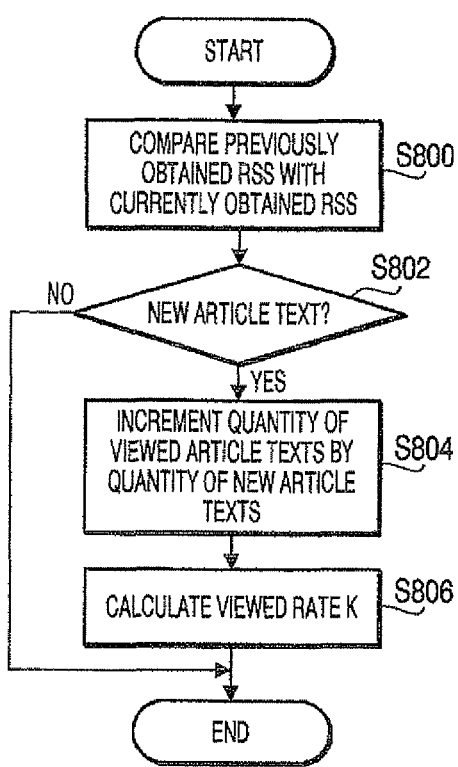
FIG. 11 is a flowchart to illustrate a viewed rate refreshing operation according to the embodiments of the present invention.

Next, the viewed rate refreshing operation to be conducted in S708 in the RSS data obtaining operation will be described with reference to FIG. 11. When the operation starts, in S800, the control unit 210 compares the article texts 3500 included in the RSS data 2208, which was obtained and stored in S704 according to the RSS site representing information designated in S702 in the currently-running RSS data obtaining operation, with older article texts 3500 included in the RSS data 2208, which was obtained and stored in S704 in a previously-conducted RSS data obtaining operation according to the identical RSS site representing information 2206.

In S802, the control unit 210 judges as to whether a new article text 3500 is included in the RSS data 2208, which was obtained and stored in S704 in the currently-running RSS data obtaining operation. If no new article text 3500 is included (S802: NO), the control unit 210 terminates the flow and returns to S700 (see FIG. 10). If a new article text 3500 is included (S802: YES), in S804, the control unit 210 adds a quantity of the new article text 3500 to the quantity (Sn) of the obtained article texts 3500. Thus, the quantity (Sn) of article texts 3500 is updated and registered with the RSS module 2204.

In S806, the control unit 210 refers to the quantity of viewed article texts (Kn) registered with the RSS module 2204 and divides the quantity of viewed article texts (Kn) by the quantity of obtained article texts (Sn) to obtain a new viewed rate (K). The updated viewed rate (K) is registered with the RSS module 2204. The control unit 210 terminates the flow and returns to S700 (see FIG. 7).

The viewed rate (K) registered with the RSS module 2204 in S806 is transmitted from the MFP 20 to the PC 100 in response to the request from the PC 100 in S412 in the RSS site representing information registering operation (see FIG. 7).

According to the operations described in the above embodiments, the RSS site representing information concerning the information providing sites which deliver the content summary information can be easily registered with the MFP 200 by the PC 100. In this regard, registration of the RSS site representing information is conducted in the PC 100, and it is not necessary that the user directly manipulates the MFP 200.

Although examples of carrying out the invention has been described, those skilled in the art will appreciate that there are numerous variations and permutations of the a computer readable storage medium containing computer readable instructions that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

Examples of variations of the computer readable storage medium for the operations to be conducted in the printing system 10 will be described below.

In the above embodiments, the content summary information to be registered with the storage units 1210, 2208 of the PC 100 and the MFP 200 is in the RSS-format; however, a format of the content summary information is not limited to the RSS, but may be, for example, Atom Syndication Format (Atom). When the content summary information is in the Atom format, the feed information is delivered by Atom servers.

In the above embodiments, the PC 100 and the RSS-enabled device (i.e., the MFP 200) are connected with each other through the LAN 800; however, the PC 100 and the RSS-enabled device may be connected through USB (Universal Serial Bus) interfaces. Further, the RSS-enabled device, with which the RSS site representing information is registered in the RSS site representing information registering operation, may not necessarily be the MFP 200, but may be, for example, a printer, a scanner, a facsimile machine, and other image forming apparatuses.

In the above embodiments, the RSS site representing information 1208, 2206 includes a title 3000 and URLs being location addresses of the RSS sites, from which the RSS data is obtained. However, the RSS site representing information should include at least the URLs of the RSS sites, and may not necessarily include the title 3000.

In the above embodiments, the control unit 210 of the MFP 200 activates the RSS data obtaining operation in S518 (see FIG. 10) according to the user's input of the RSS data obtaining command through the operation unit 270 of the MFP 200 in S516. However, the RSS data obtaining operation may be activated, for example, according to predetermined timings, which can be measured by a timer (not shown) provided in the MFP 200.

In the above embodiments, the RSS data obtaining operation (see FIG. 10) to be conducted in the MFP main operation (see FIG. 8) includes the update-frequency obtaining operation in S706 and the viewed rate refreshing operation in S708. However, for example, when the PC 100 conducts the RSS site representing information registering operation (see FIG. 3) according to the first embodiment, the viewed rate refreshing operation in S708 can be omitted from the RSS data obtaining operation. Alternatively, when the PC 100 conducts the RSS site representing information registering operation (see FIG. 7) according to the second embodiment, the update-frequency obtaining operation in S706 can be omitted from the RSS data obtaining operation.

In the above embodiments, in the RSS site representing information registering operation according to the first and the second embodiments, the control unit 110 obtains the acceptable quantity (N) of pieces of RSS site representing information 2206 to be registered with the MFP 200 and the quantity (M) of pieces of automatically-registered RSS site representing information 2206 so that the combined (N+M) quantity of pieces of RSS site representing information can be registered with the MFP 200 (see S124 in FIGS. 3 and 7). However, for example, the control unit 110 may obtain the acceptable quantity (N) of pieces of RSS site representing information 2206 to be registered from the MFP 200, extracts the N-pieces of RSS site representing information 1208 registered with the RSS reader 1206, and registers the extracted N-pieces of RSS site representing information 1208 with the MFP 200. In this regard, the N-pieces of RSS site representing information 1208 are extracted in the order of update-frequency (Z) in S122 (see FIG. 3) or in the order of higher viewed rate (K) in S418 (see FIG. 7). Further, it is even more preferable that N-pieces of RSS site representing information which are unregistered with the MFP 200 are registered (see S120 in FIGS. 3 and 7).

What is claimed is:

1. A non-transitory computer readable storage medium storing computer readable instructions to cause a computer to register a plurality of pieces of site representing information with a communication device, the computer being connectable with the communication device via a network, each of the plurality of pieces of the site representing information enabling the communication device to obtain content summary information and including location information to indicate a location of an information providing site which provides the content summary information the content summary information, the computer readable instructions, when executed, cause the computer to execute:

accessing, via the network, each of a plurality of information providing sites based on the location information included in each of the plurality of pieces of representing information, each of the plurality of pieces of the site representing information having been registered with the computer;

obtaining information concerning a frequency of updates of the content summary information from each of the plurality of information providing sites;

determining a predetermined number of information providing sites exhibiting higher frequencies of updates of the content summary information from among the plurality of information providing sites based on the information concerning the frequency of updates of the content summary information obtained from the plurality of information providing sites; and transmitting to the communication device, via the network, the site representing information of each of the predetermined number of information providing sites which are determined to exhibit the higher frequencies of updates of the content summary information and a registering command to register the site representing information with the communication device.

2. The computer readable storage medium according to claim 1,
wherein the content summary information includes article textual information concerning an information content provided through the network and corresponding updated time information indicating an updated time of the content summary information in which the article textual information was added to the content summary information;
wherein, when the plurality of pieces of site representing information are registered with the computer, the computer readable instructions further cause the computer to execute:
obtaining the updated time information from each of the plurality of information providing sites; and
calculating the frequency of updates of the content summary information based on the updated time information.

3. The computer readable storage medium according to claim 2,
wherein, when the site representing information is registered with the communication device, the computer readable instructions further cause the computer to execute steps of:
obtaining the site representing information registered with the communication device; and
obtaining the update-frequencies of the content summary information, which was obtained by the communication device from the information providing sites according to the site representing information registered with the communication device, from the communication device on basis of the information providing site.

4. The computer readable storage medium according to claim 1,
wherein the content summary information includes the location information and the title of the information content to be in correspondence with each other; and
wherein, when a plurality of pieces of site representing information are registered with the computer, the computer readable instructions further cause the computer to execute steps of:
obtaining a viewed rate, which indicates a rate of a quantity of pieces of content information being accessed by the computer according to the location information corresponding to the article textual information, which is included in the content summary information obtained by the computer according to the plurality of pieces of registered site representing information, amongst a total quantity of pieces of article textual information included in the content summary information, on basis of the information providing site;
determining a predetermining quantity of information providing sites with higher viewed rates to extract amongst the plurality of information providing sites based on the obtained viewed rates of the content information; and
registering the site representing information concerning the predetermined quantity of extracted information providing sites with the communication device.

5. The computer readable storage medium according to claim 4,
wherein, when the site representing information is registered with the communication device, the computer readable instructions further cause the computer to execute steps of:
obtaining the site representing information registered with the communication device; and
obtaining the viewed rates of the content summary information, which was obtained by the communication device from the information providing sites according to the site representing information registered with the communication device, from the communication device on basis of the information providing site.

6. The computer readable storage medium according to claim 1,
wherein the computer readable instructions further cause the computer to execute steps of:
obtaining a quantity of pieces of site representing information for the communication device to be registered with;
registering the quantity of pieces of site representing information with the communication device, the quantity being equivalent to the acceptable quantity of pieces of site representing information for the communication device.

7. A computer configured to register a plurality of pieces of site representing information with a communication device, the computer being connectable with the communication device via a network, wherein each of the plurality of pieces of the site representing information enables the communication device to obtain content summary information and includes location information to indicate a location of an information providing site which provides the content summary information and a title of the content summary information, the computer comprising:
an accessing unit configured to obtain access, via the network, each of a plurality of information providing sites based on the location information included in each of the plurality of pieces of site representing information, each of the plurality of pieces of the site representing information having been registered with the computer;
an obtaining unit configured to obtain information concerning a frequency of updates of the content summary information from each of the plurality of information providing sites;
a determining unit configured to determine a predetermined number of information providing sites exhibiting higher frequencies of updates of the content summary information from among the plurality of information providing sites based on the information concerning the frequency of updates of the content summary information obtained from the plurality of information providing sites; and
a transmitting unit configured to transmit to the communication device, via the network, the site representing information of each of the predetermined number of information providing sites which are determined to exhibit the higher frequencies of updates of the content summary information and a registering command to register the site representing information with the communication device.

8. A non-transitory computer readable storage medium storing computer readable instructions for a computer which is connectable with a communication device via a network, the computer being configured to register a plurality of pieces of site representing information with the communication device, each of the plurality of pieces of site representing information including location information indicating a location of an information providing site which provides content summary information via the network, the computer readable instructions, when executed, cause the computer to execute:

accessing, via the network, each of a plurality of information providing sites based on the location information included in each of the plurality of pieces of site representing information;

obtaining information concerning a frequency of updates of the content summary information from each of the plurality of information providing sites;

determining a predetermined number of information providing sites exhibiting higher frequencies of updates of the content summary information from among the plurality of information providing sites based on the information concerning the frequency of updates of the content summary information obtained from the plurality of information providing sites; and transmitting to the communication device, via the network, the site representing information of each of the predetermined number of information providing sites which are determined to exhibit the higher frequencies of updates of the content summary information.

* * * * *

UNITED STATES PATENT AND TRADEMARK OFFICE
CERTIFICATE OF CORRECTION

| | | |
|---|---|---|
| PATENT NO. | : 9,128,808 B2 | Page 1 of 1 |
| APPLICATION NO. | : 12/726535 | |
| DATED | : September 8, 2015 | |
| INVENTOR(S) | : Tomoki Nakamura | |

It is certified that error appears in the above-identified patent and that said Letters Patent is hereby corrected as shown below:

Title Page, Item (56) Column 2

It Should Read:

OTHER PUBLICATIONS

Japanese Official Action dated Jun. 29, 2010 with English translation.
Office Action dated September 4, 2012 received from the Japanese Patent Office from related Japanese Application No. 2011-063690 and USSN: 12/560,734, together with an English-language translation.

(Continued)

Signed and Sealed this
Twenty-ninth Day of March, 2016

Michelle K. Lee
*Director of the United States Patent and Trademark Office*